United States Patent
Tsai et al.

(10) Patent No.: US 6,422,819 B1
(45) Date of Patent: Jul. 23, 2002

(54) COOLED AIRFOIL FOR GAS TURBINE ENGINE AND METHOD OF MAKING THE SAME

(75) Inventors: Gene C. F. Tsai; Sung Tung, both of Lexington; Terence C. Flaherty, Marblehead; Robert F. Manning, Newburyport, all of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/457,652

(22) Filed: Dec. 9, 1999

(51) Int. Cl.[7] .................................................. F01D 5/08
(52) U.S. Cl. ..................................... 416/97 R; 416/235
(58) Field of Search ............................... 416/97 R, 96 R, 416/96 A; 415/115, 116, 235

(56) References Cited

U.S. PATENT DOCUMENTS

| | | | |
|---|---|---|---|
| 4,153,386 A | * 5/1979 | Leogrande et al. | ......... 415/115 |
| 5,259,730 A | 11/1993 | Damlis et al. | ............ 416/96 A |
| 5,281,084 A | 1/1994 | Noe et al. | .................... 415/115 |
| 5,516,260 A | 5/1996 | Damlis et al. | .............. 415/115 |
| 5,630,700 A | 5/1997 | Olsen et al. | ................. 415/134 |
| 6,102,658 A | * 8/2000 | Kvasnak et al. | .......... 416/97 R |
| 6,126,397 A | * 10/2000 | Kvasnak et al. | .......... 416/97 R |
| 6,179,565 B1 | * 1/2001 | Palumbo et al. | .......... 416/97 R |

* cited by examiner

*Primary Examiner*—Edward K. Look
*Assistant Examiner*—James M McAleenan
(74) *Attorney, Agent, or Firm*—Andrew C. Hess; William Scott Andes

(57) ABSTRACT

An airfoil for use in a gas turbine engine includes a pressure side and a suction side joined at a trailing edge wall that defines a trailing edge. The airfoil includes at least one cooling hole extending through the trailing edge wall so as to pass cooling fluid from the pressure side of the airfoil to the suction side.

26 Claims, 3 Drawing Sheets

COOLED AIRFOIL FOR GAS TURBINE ENGINE AND METHOD OF MAKING THE SAME

BACKGROUND OF THE INVENTION

This invention relates generally to gas turbine engines and more particularly to turbine nozzle vane airfoils used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor. The turbine rotor comprises a row of rotor blades mounted to the perimeter of a rotor disk that rotates about the centerline axis of the engine. The nozzle, which channels combustion gases into the turbine rotor in such a manner that the turbine rotor can do work, includes a plurality of circumferentially spaced apart vanes radially aligned with the rotor blades. Turbine nozzles are typically segmented around the circumference thereof to accommodate thermal expansion. Each nozzle segment has one or more nozzle vanes disposed between inner and outer bands that define the radial flowpath boundaries for the hot combustion gases flowing through the nozzle.

The high pressure turbine nozzle is mounted at the exit of the combustor and is therefore exposed to extremely high temperature combustion gases. Thus, the turbine blades and nozzle vanes typically employ internal cooling to keep their temperatures within certain design limits. The nozzle vanes are hollow airfoils having a pressure side wall and a suction side wall joined together at leading and trailing edges. Various conventional configurations exist for cooling both the vanes and the bands. The most common types of cooling include impingement and film cooling. To effect impingement cooling, the airfoil includes one or more perforated hollow inserts that are suitably mounted therein. Cooling air (ordinarily bled off from the engine's compressor) is channeled into the inserts and then impinges against the inner surface of the airfoil for impingement cooling thereof. Film cooling is accomplished by passing the cooling air through small film cooling holes formed in the airfoil so as to produce a thin layer of cooling air on the outer surface of the airfoil.

During operation, the hot combustion gases flow around each of the nozzle vanes between the outer and inner bands. Accordingly, the turbine nozzle thermally expands upon being heated, and contracts when temperatures are reduced. This can result in significant temperature gradients, especially during transient engine operation. The temperature gradients and differential thermal movement of the nozzle components result in thermally induced strain and stress that must be kept within suitable limits to ensure life expectancy of the nozzle.

The trailing edges of conventional vanes are particularly susceptible to thermal stress. Because it is very thin compared to the rest of the airfoil, the trailing edge responds more quickly to hot combustion gas flow than the surrounding airfoil material, resulting in severe temperature gradients that generate high thermal stress. Furthermore, the trailing edge is typically much hotter than the rest of the airfoil. Even with conventional cooling, the thermal stress can be sufficiently high to cause fatigue cracks in the trailing edge. Such cracks have an adverse impact on engine performance and may even result in engine failure should multiple cracks be allowed to link together.

Trailing edge distress can be reduced or eliminated by providing sufficient cooling to the vane trailing edge. Conventional cooling of a modern high pressure turbine nozzle vane is accomplished by film cooling from pressure side film cooling holes and pressure side slot film cooling. In addition, suction side film cooling holes also aid in cooling the trailing edge. However, aerodynamics on the airfoil are such that cooling air introduced on the suction side has a detrimental impact on turbine efficiency. In particular, introduction of film cooling air on the suction side just downstream of the nozzle throat plane is significantly detrimental to performance. Therefore, the majority of trailing edge cooling is provided by the pressure side film slots.

Thermal barrier coatings are commonly used to supplement existing impingement and/or film cooling means and thereby avoid trailing edge cracking. However, known thermal barrier coatings are relatively expensive and thus add to the cost of the nozzle vane.

Accordingly, there is a need for a turbine airfoil having improved trailing edge cooling that does not require a thermal barrier coating.

SUMMARY OF THE INVENTION

The above-mentioned need is met by the present invention which provides an airfoil having a pressure side and a suction side joined at a trailing edge wall that defines a trailing edge. The airfoil includes at least one cooling hole extending through the trailing edge wall so as to pass cooling fluid from the pressure side of the airfoil to the suction side.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
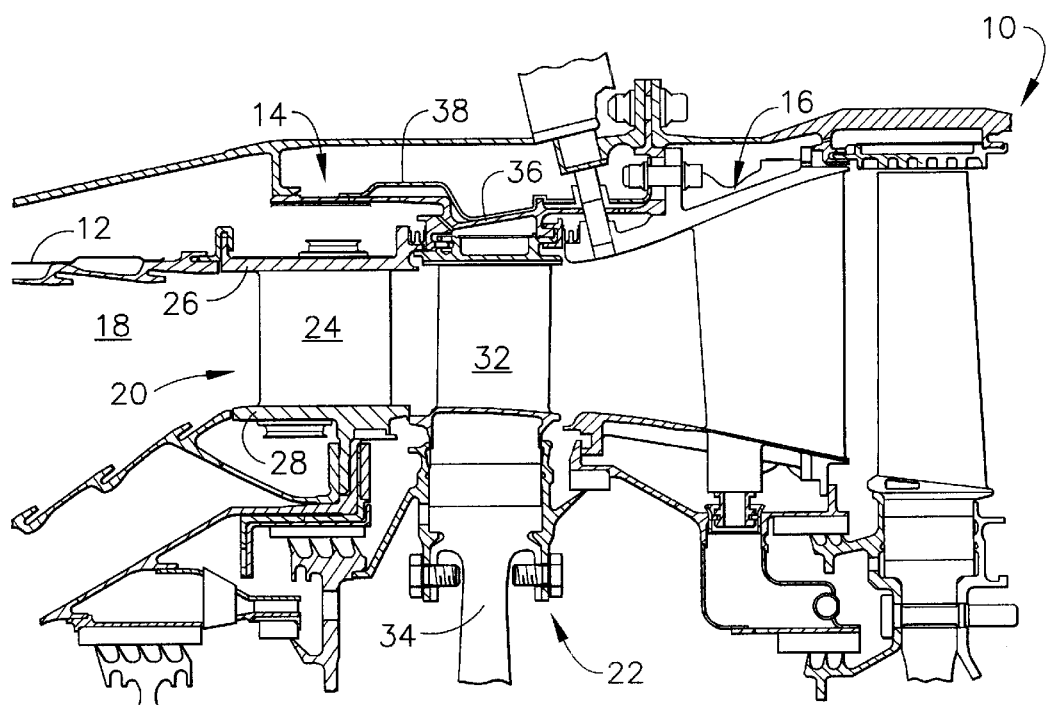
FIG. 1 is a partial cross-sectional view of a gas turbine engine having the stationary flowpath components of the present invention.

Referring to the drawings wherein identical reference numerals denote the same elements throughout the various views, FIG. 1 shows a portion of a gas turbine engine 10 having, among other structures, a combustor 12, a high pressure turbine 14, and a low pressure turbine 16. The combustor 12 includes a generally annular hollow body defining a combustion chamber 18 therein. A compressor (not shown) provides compressed air that passes primarily into the combustor 12 to support combustion and partially around the combustor 12 where it is used to cool both the combustor liners and turbomachinery further downstream. Fuel is introduced into the forward end of the combustor 12 and is mixed with the air in a conventional fashion. The resulting fuel-air mixture flows into the combustion chamber 18 where it is ignited for generating hot combustion gases. The hot combustion gases are discharged to the high pressure turbine 14 located downstream of the combustor 12 where they are expanded so that energy is extracted. The hot gases then flow to the low pressure turbine 16 where they are expanded further.

The high pressure turbine 14 includes a turbine nozzle 20 and a turbine rotor 22. The turbine nozzle 20 includes a plurality of circumferentially spaced vanes 24 (only one shown in FIG. 1) that are supported between a number of arcuate outer bands 26 and arcuate inner bands 28. The vanes 24, outer bands 26 and inner bands 28 are arranged into a plurality of circumferentially adjoining nozzle segments that collectively form a complete 360° assembly. Preferably, each nozzle segment has two of the vanes 24 disposed between one of the outer bands 26 and one of the inner bands 28. It should be noted that the present invention is not limited to nozzle segments having two vanes, as nozzle segments having other numbers of vanes are known. In any event, the vanes 24 are configured so as to optimally direct the combustion gases to the turbine rotor 22. The outer and inner bands 26 and 28 of each nozzle segment define the outer and inner radial boundaries, respectively, of the gas flow through the nozzle 20.

The turbine rotor 22 includes a plurality of circumferentially spaced apart blades 32 (only one shown in FIG. 1) extending radially outwardly from a rotor disk 34 that rotates about the centerline axis of the engine. The blades 32 include airfoil portions that extend into the gas flow. A plurality of arcuate shrouds 36 is arranged circumferentially in an annular array so as to closely surround the rotor blades 32 and thereby define the outer radial flowpath boundary for the hot combustion gases flowing through the turbine rotor 22. The shrouds 36 are stationary members supported by a shroud support 38 that is fastened to the engine outer case in a conventional manner.

Figure 2:
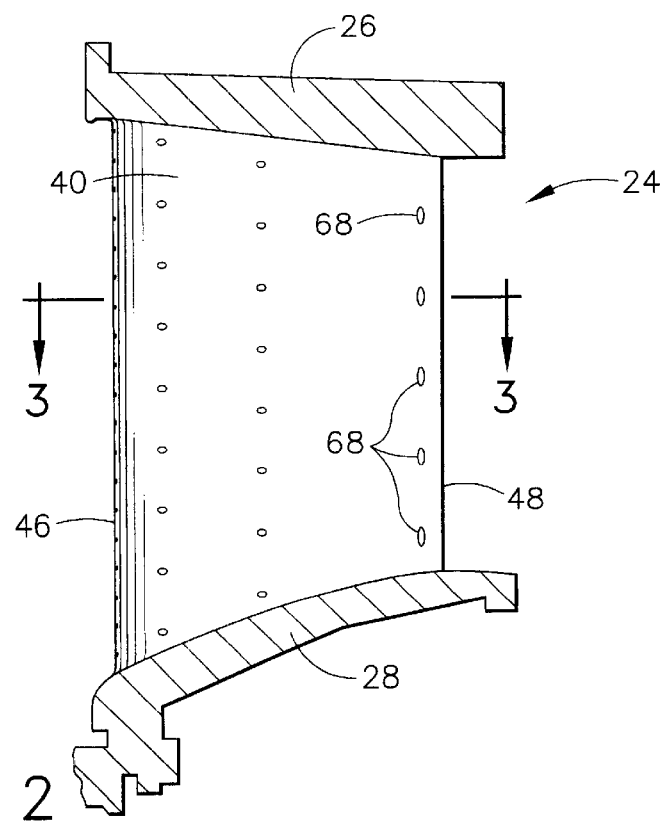
FIG. 2 is a side view of a turbine nozzle vane of the present invention.
Figure 3:
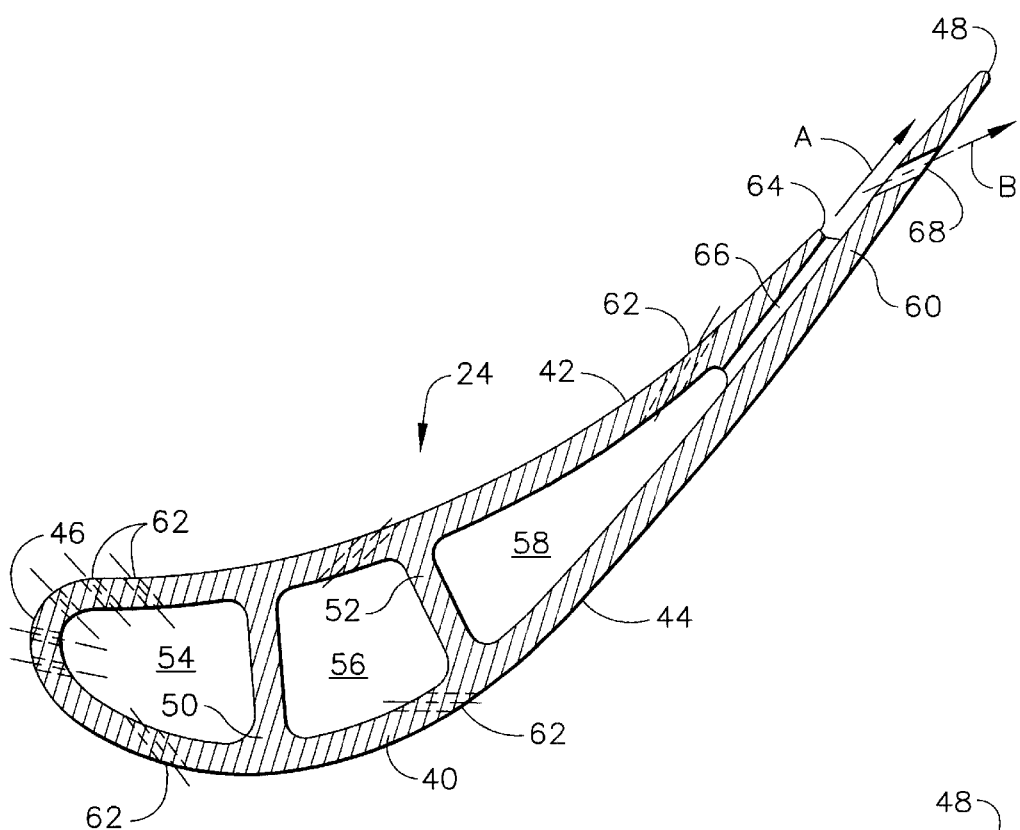
FIG. 3 is a cross-sectional view of the nozzle vane taken along line 3—3 of FIG. 2.

Referring to FIGS. 2 and 3, one of the nozzle vanes 24 is shown in greater detail. While a nozzle vane is being used as an example to facilitate disclosure of the present invention, it should be recognized that the present invention is applicable to any component having an airfoil, including turbine rotor blades, that requires cooling. The vane 24 includes a hollow airfoil 40 having a concave, pressure side 42 and a convex, suction side 44 joined together at a leading edge 46 and at a trailing edge 48. The airfoil 40 extends lengthwise, or radially, from the inner band 28 to the outer band 26. The airfoil 40 includes two internal walls 50,52 that divide the airfoil interior into three radially extending cavities 54,56,58. Although three internal cavities are shown for purposes of illustration, it should be noted that the present invention is not limited to three cavities; fewer or more cavities could be provided. The portion of the airfoil that extends chordwise beyond the rearmost cavity 58 is referred to herein as the trailing edge wall 60. Accordingly, the trailing edge 48 is at the rear of the trailing edge wall 60.

Cooling fluid (ordinarily air bled off from the engine's compressor) is supplied to each of the internal cavities 54,56,58 in a manner well known in the art. This cooling fluid passes through film cooling holes 62 formed in the pressure and suction sides 42 and 44 so as to provide fluid communication between the cavities 54,56,58 and selected areas on the outer surface of the airfoil 40. The cooling fluid exhausted through the film cooling holes 62 flows along the airfoil outer surface forming a film that cools the outer surface and insulates it from the high temperature combustion gases.

A radially extending step 64 is formed in the trailing edge wall 60 on the pressure side 42 of the airfoil 40. A plurality of cooling slots 66 extend from the rearmost cavity 58 to the step 64, thereby providing fluid communication between the rearmost cavity 58 and the pressure side of the trailing edge wall 60. The cooling fluid (represented by arrow A in FIG. 3) exhausted through the cooing slots 66 cools the trailing edge wall 60. The cooling slots 66 exit at the step 64 because the trailing edge wall 60 is generally too thin to support slots extending all the way to the trailing edge 48.

To ensure that the suction side of the trailing edge wall 60 is adequately cooled, a plurality of cooling holes 68 is formed in the trailing edge wall 60. Specifically, the cooling holes 68 extend laterally through the trailing edge wall 60, from the pressure side 42 to the suction side 44. The throughwall cooling holes 68 have inlets located on the pressure side 42, downstream, or aft, of the step 64 and the cooling slots 66. Thus, a portion of the cooling fluid exiting the cooling slots 66 will pass through the through-wall cooling holes 68 (as represented by arrow B in FIG. 3) and exit on the suction side of the trailing edge wall 60. By directing cooling fluid to the suction side of the trailing edge wall 60, the through-wall cooling holes 68 reduce temperature gradients and thermal stress in the trailing edge 48.

Figure 4:
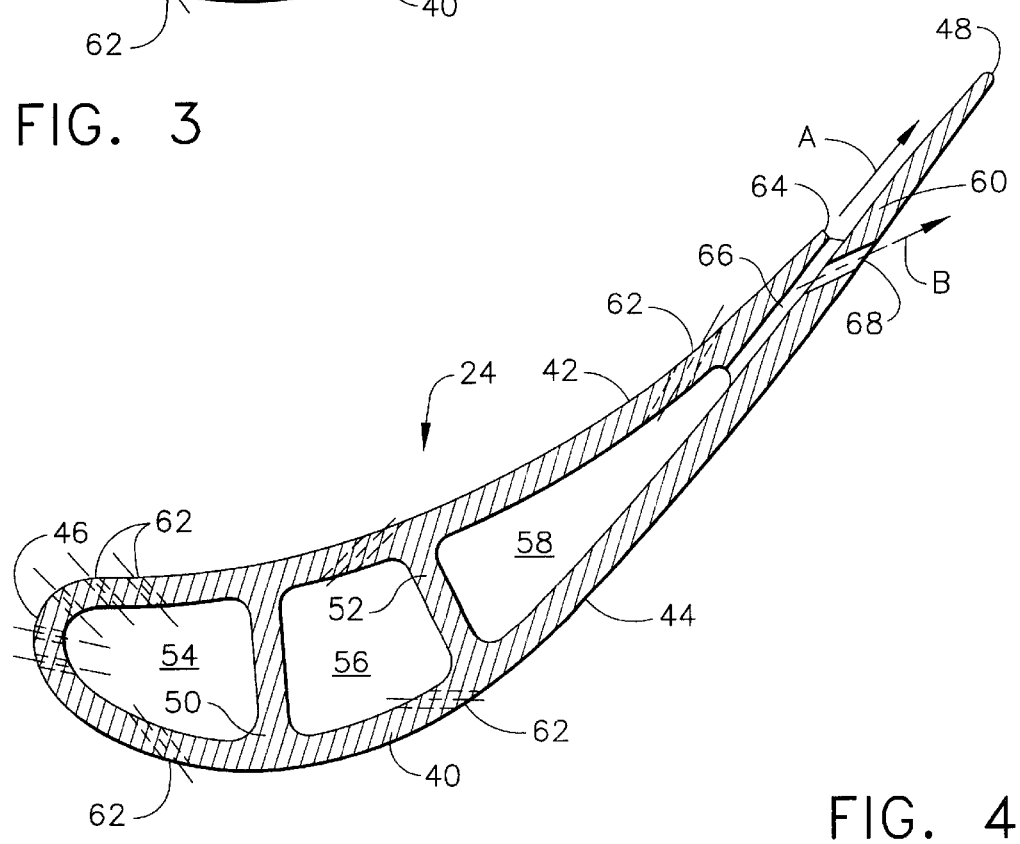
FIG. 4 is a cross-sectional view of an alternative embodiment of a turbine nozzle vane.

Alternatively, the through-wall holes 68 could have inlets located in the cooling slots 66 as shown in FIG. 4 so that the through-wall holes 68 intersect the cooling slots 66. In this case, a portion of the cooling fluid passing through the cooling slots 66 will pass through the through-wall cooling holes 68 (as represented by arrow B in FIG. 4) and exit on the suction side of the trailing edge wall 60. As seen in FIGS. 3 and 4, the through-wall cooling holes 68 are preferably angled downstream (i.e., toward the trailing edge 48) so that the exiting cooling fluid will flow along the outer surface on the suction side of the trailing edge wall 60.

Figure 5:
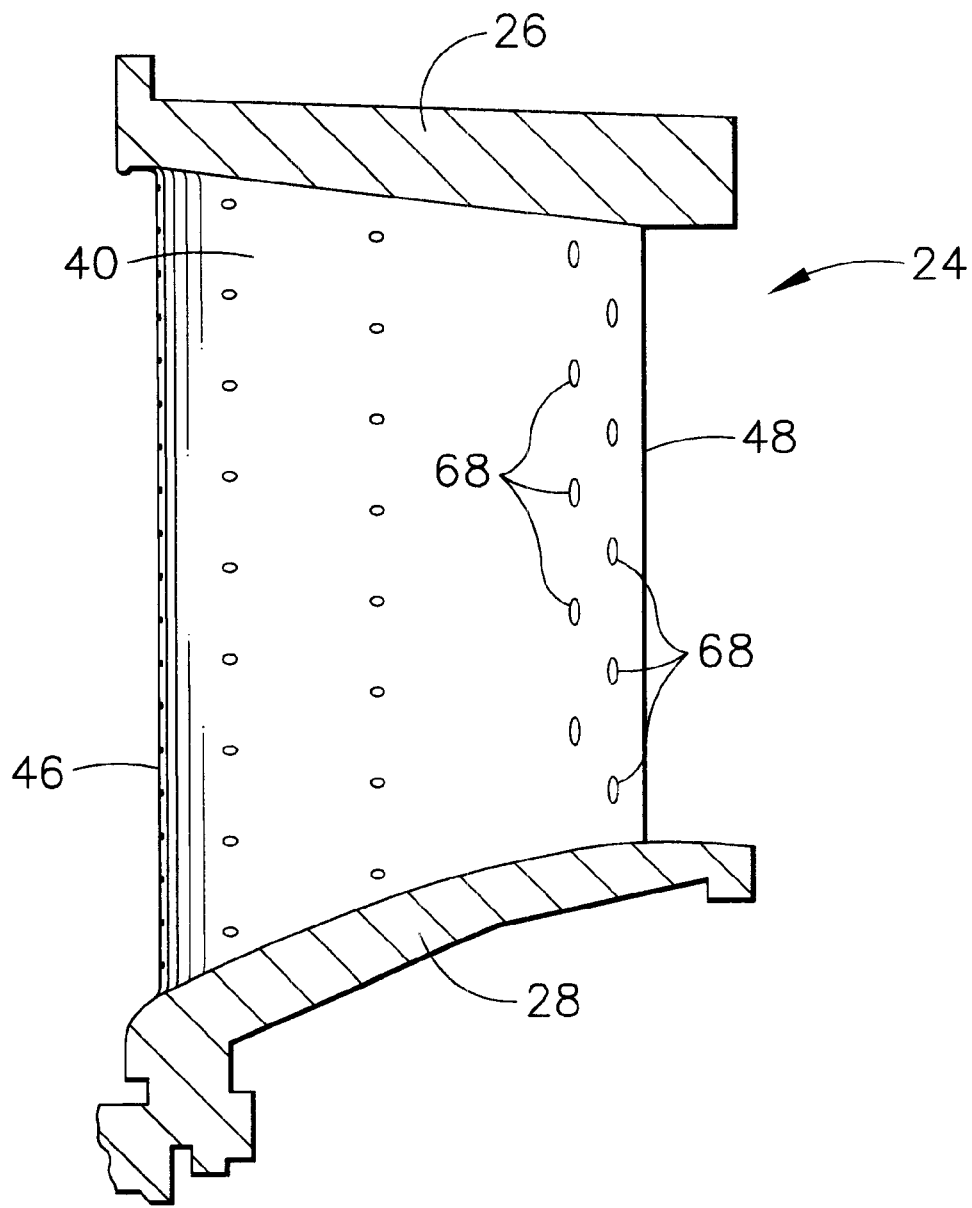
FIG. 5 is a side view of an alternative embodiment of a turbine nozzle vane.

As seen in FIG. 2, the through-wall cooling holes 68 are preferably arranged in a radial or lengthwise row that extends substantially the length of the airfoil 40. Alternatively, the through-wall cooling holes 68 can be arranged in multiple lengthwise rows as shown in FIG. 5. In which case, the cooling holes 68 of one row are staggered with respect to the cooling holes 68 of the adjacent row to best distribute the cooling fluid over the trailing edge wall 60. The through-wall cooling holes 68 can have almost any shape, including oval (as shown in the Figures), circular, rectangular and so on.

The present invention provides a turbine airfoil 40 in which cooling of the trailing edge 48 is improved by the addition of an aft, suction side film bleed from the pressure side slot film. Aerodynamic studies conclude that introduction of suction side film cooling in the extreme aft portion of the airfoil (as opposed to the region just downstream of the nozzle throat plane) does not significantly reduce engine performance. Cooling analysis shows that the addition of this suction side cooling film via the through-wall cooling holes 68 is extremely effective in cooling the trailing edge 48. In fact, the through-wall cooling holes 68 reduce temperature gradients and thermal stress in the trailing edge 48 as effectively as thermal barrier coatings. Thus, use of the through-wall cooling holes 68 eliminates the need to use a costly thermal barrier coating. However, it should be noted that the through-wall cooling holes 68 are compatible with thermal barrier coatings. That is, through-wall cooling holes could be used in conjunction with a thermal barrier coating to achieve an even greater level of thermal protection.

The foregoing has described a turbine airfoil in which trailing edge temperature gradients are reduced by providing through-wall cooling holes in the trailing edge wall. While specific embodiments of the present invention have been described, it will be apparent to those skilled in the art that various modifications thereto can be made without departing from the spirit and scope of the invention as defined in the appended claims.

What is claimed is:

1. An airfoil comprising:
   a pressure side and a suction side joined at a trailing edge wall that defines a trailing edge; and
   means for directing cooling fluid from said pressure side of said trailing edge wall to said suction side of said trailing edge wall.

2. The airfoil of claim 1 wherein said means for directing cooling fluid comprises at least one cooling hole extending through said trailing edge wall.

3. The airfoil of claim 2 wherein said at least one cooling hole is angled toward said trailing edge.

4. The airfoil of claim 1 wherein said means for directing cooling fluid comprises a plurality of cooling holes extending through said trailing edge wall.

5. The airfoil of claim 4 wherein said cooling holes are arranged in a lengthwise extending row.

6. The airfoil of claim 4 wherein said cooling holes are arranged in a plurality of lengthwise extending rows.

7. The airfoil of claim 4 wherein said cooling holes are angled toward said trailing edge.

8. An airfoil comprising:
   a pressure side and a suction side joined at a trailing edge wall that defines a trailing edge; and
   at least one cooling hole extending through said trailing edge wall so as to exit on said suction side of said trailing edge wall.

9. The airfoil of claim 8 further comprising additional cooling holes extending through said trailing edge wall.

10. The airfoil of claim 9 wherein said cooling holes are arranged in a lengthwise extending row.

11. The airfoil of claim 9 wherein said cooling holes are arranged in a plurality of lengthwise extending rows.

12. The airfoil of claim 8 wherein said at least one cooling hole is angled toward said trailing edge.

13. The airfoil of claim 8 further comprising at least one cooling slot formed in said pressure side of said trailing edge wall, said at least one cooling hole being located aft of said at least one cooling slot.

14. The airfoil of claim 8 further comprising at least one cooling slot formed in said pressure side of said trailing edge wall, said at one cooling hole intersecting said at least one cooling slot.

15. An airfoil comprising:
   a pressure side and a suction side joined at a trailing edge wall that defines a trailing edge;
   at least one internal cavity;
   a step formed in said pressure side of said trailing edge wall;
   at least one cooling slot extending from said internal cavity to said step; and
   at least one cooling hole extending through said trailing edge wall so as to exit on said suction side of said trailing edge wall.

16. The airfoil of claim 15 further comprising additional cooling holes extending through said trailing edge wall.

17. The airfoil of claim 16 wherein said cooling holes are arranged in a lengthwise extending row.

18. The airfoil of claim 16 wherein said cooling holes are arranged in a plurality of lengthwise extending rows.

19. The airfoil of claim 15 wherein said at least one cooling hole is angled toward said trailing edge.

20. The airfoil of claim 15 wherein said at least one cooling hole is located aft of said cooling slot.

21. The airfoil of claim 15 wherein said at least one cooling hole intersects said cooling slot.

22. A method of making an airfoil of the type having a pressure side and a suction side joined at a trailing edge wall that defines a trailing edge, said method comprising forming at least one cooling hole through said trailing edge wall so that said cooling hole exits on said trailing edge wall.

23. The method of claim 22 further comprising forming additional cooling holes through said trailing edge wall.

24. The method of claim 23 wherein said cooling holes are arranged in a lengthwise extending row.

25. The method of claim 23 wherein said cooling holes are arranged in a plurality of lengthwise extending rows.

26. The method of claim 22 wherein said at least one cooling hole is angled toward said trailing edge.

\* \* \* \* \*